United States Patent [19]

Baatrup et al.

[11] 4,065,921
[45] Jan. 3, 1978

[54] HYDRAULIC CONTROL MEANS, PARTICULARLY FOR VEHICLE STEERING MEANS

[75] Inventors: Johannes Vagn Baatrup, Sonderborg; Thorkild Christensen, Nordborg, both of Denmark

[73] Assignee: Danfoss A/S, Nordborg, Denmark

[21] Appl. No.: 744,624

[22] Filed: Nov. 24, 1976

[30] Foreign Application Priority Data

Nov. 29, 1975 Germany ............................. 2553748

[51] Int. Cl.² ............................................. F15B 15/18
[52] U.S. Cl. ......................................... 60/385; 60/386
[58] Field of Search .......................... 60/385, 386, 387

[56] References Cited

U.S. PATENT DOCUMENTS

| | | | |
|---|---|---|---|
| 3,218,805 | 11/1965 | Pruvot | 60/386 |
| 3,436,915 | 4/1969 | Mercier | 60/386 |
| 3,600,893 | 8/1971 | Hudgens | 60/387 |

*Primary Examiner*—Edgar W. Geoghegan

[57] ABSTRACT

The invention relates to a hydraulic control unit for a servomotor of the type used for vehicle steering systems. The unit has a control circuit with a power operated pump and a hand operated metering motor and an operating circuit with a power operated pump. The two circuits intersect upstream from the servomotor. A pressure comparison, throttling and proportioning valve is disposed between the outlets of the two pumps of the control and operating circuits. The proportioning valve is controlled by a differential pressure applied by the pumps and a spring which supplements the operating pump pressure. In the normal operating mode the proportioning valve allows a minor fractional flow of the pressurized fluid generated by the control pump to flow through the valve to the operating circuit. Under varying conditions when either of the pumps become wholly or partially inoperative the proportioning valve provides for an increased flow from the unaffected circuit to the disabled circuit to maintain a degree of operation until such time that the breakdown has been cured.

8 Claims, 6 Drawing Figures

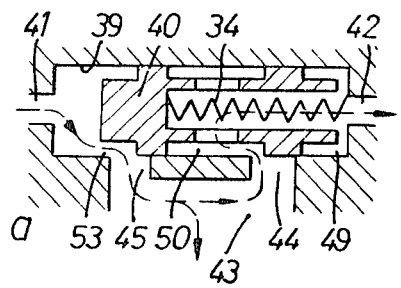
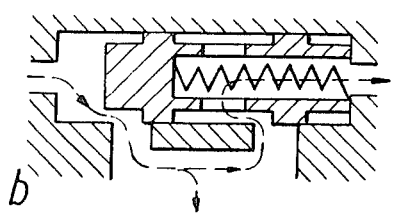
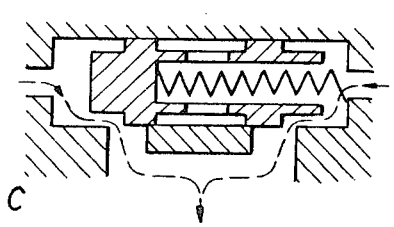
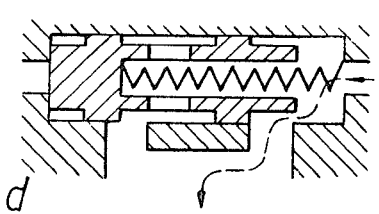
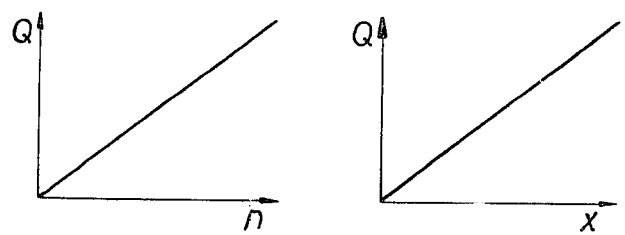
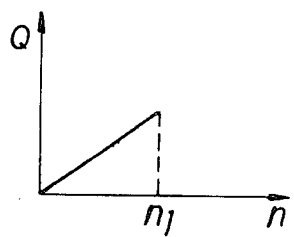
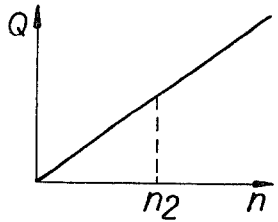
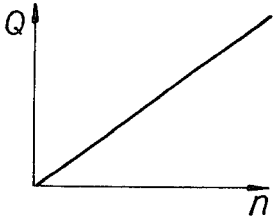
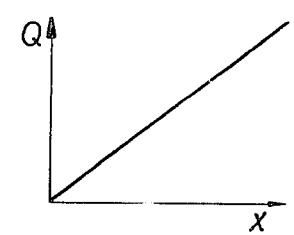
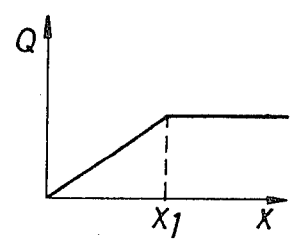
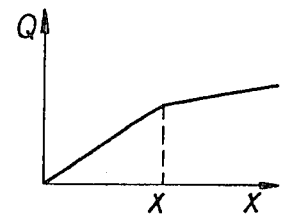
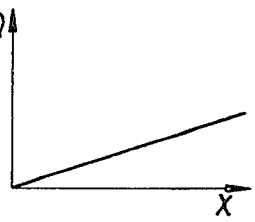
FIG. 3          FIG. 4          FIG. 5
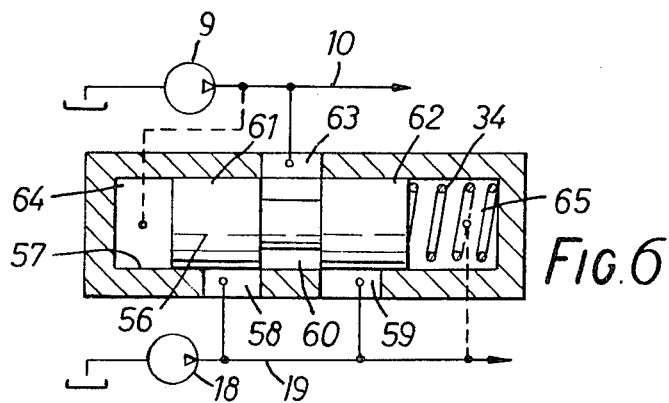
FIG. 6

HYDRAULIC CONTROL MEANS, PARTICULARLY FOR VEHICLE STEERING MEANS

The invention relates to hydraulic control means for a servo motor, comprising a control circuit and an operating circuit for which the pressure fluids are combined upstream of the servo motor, wherein the control circuit comprises a control circuit pump, a quantity setting device and a control circuit throttle valve that is controlled in cross-section by the pressure difference applied thereto, the operating circuit comprises an operating circuit pump, a throttle and discharge device controlled by a force comparator and an operating circuit throttle valve tht is likewise controlled in cross-section by the pressure difference applied thereto, and the setting element of the force comparator is subjected in opposite directions to the pressure upstream of the control circuit throttle valve and the operating circuit throttle valve, respectively, particularly for vehicle steering means.

In known control means of this kind, the operating circuit and control circuit are interconnected between the respective throttle valves and the servo motor. If the operating circuit pump becomes inoperative, the motor can still be operated, albeit slowly, by the control circuit pump by way of the quantity setting device. If the control circuit pump becomes inoperative, emergency operation can be maintained in the case of a quantity setting device of which the measuring motor is also drivable as a manually actuated pump, although very considerable forces will then have to be transmitted to the manual steering wheel. In other known steering equipment comprising two hydraulic systems each having a pump, only the first pump normally acts on the servo motor by way of a quantity setting device whereas the second pump merely drives a motor for this quantity setting device. If, however, the first pump becomes inoperative, the second pump can feed pressure fluid into the motor connecting conduit of the first system by way of check valves.

The invention is based on the problem of improving the emergency control operation in hydraulic control means of the aforementioned kind.

This problem is solved according to the invention in that the pressure sides of the two pumps are connected by a discharge valve of which the setting element is loaded in a first direction by the pressure of the control circuit pump and in an opposite second direction by the pressure of the operating circuit pump as well as by a differential pressure spring and which, upon movement of the setting element in the first direction, progressively opens from a closed position.

With this construction for the control means, the discharge valve moves to the fully open position if the operating circuit pump becomes inoperative. Part of the quantity of pressure fluid fed by the control circuit pump is therefore transmitted to the operating circuit. The servo motor is thus fed not only with the quantity of pressure fluid flowing through the quantity setting device and the control circuit but also with the quantity of pressure fluid of the control circuit pump flowing through the operating circuit. Nevertheless, as long as the control circuit pump is still able to feed the required total quantity, the desired proportional control is maintained.

Even if the operating circuit pump does not break down completely but for some reason delivers an inadequate quantity, a corresponding follow-on supply for the control circuit pump can take place through the discharge valve. The discharge valve also has the particular property that, during normal operation, a small quantity of the control circuit pump fluid is continuously transmitted to the operating circuit under the pressure drop produced corresponding to the differential pressure spring. This produces specific conditions that enable such a discharge valve to operate in an emergency. This is in contrast with the known control means in which the pressure of the control circuit pump and the operating circuit pump are set completely independently of one another with regard to the particular operating condition, so that a conventional check valve cannot be used for the emergency control. Another advantage of the discharge valve arises in connection with the quantity setting device, as will be explained in more detail hereinafter.

In a preferred embodiment, the discharge valve likewise progressively opens from a closed position upon movement of the setting element in the second direction. The result of this is that, if the control circuit pump becomes inoperative, the discharge valve likewise moves to its open position and the operating circuit pump can then lead part of the fed quantity of liquid into the control circuit, so that almost normal operation of the quantity setting device is possible as long as the capacity of the operating circuit pump is still adequate. If the control circuit pump does not break down completely but for some reason delivers an inadequate quantity, the operating circuit pump likewise tends to feed a corresponding additional quantity into the control circuit. In this connection, the discharge valve can, in the limiting position associated with the second direction, assume a position in which the control circuit fed by the operating circuit pump is separated from the control circuit pump. This ensures that the quantity of pressure fluid derived from the operating circuit is also fully utilised by the control circuit.

From a constructional point of view, it is advisable for the discharge valve to comprise a setting element and valve slide in the form of a piston which is disposed in a bore having at least one valve orifice, one end face of which is subjected to the control circuit pump pressure and the other end face of which is subjected to the operating circuit pump pressure and the differential pressure spring. The piston in this case works as a setting element and valve slide.

The bore may in this case comprise a valve orifice which is connected to the one pump and which is covered in the closed position by a collar of the piston, and both sides of the collar may be adjoined by valve chambers connected to the other pump.

Another possibility is that between two collars the piston comprises a valve chamber connected to the one pump and that in the closed position the collars close two axially offset valve orifices in the bore that are connected to the other pump. In both cases, it is ensured that the discharge valve progressively opens in both directions starting from the closed position.

Separation of the control circuit pump from the control circuit is achieved simply in that the bore has, axially offset from the valve orifice(s), a control aperture which is disposed between the control circuit pump and the associated pressure conduit and which is progressively covered by the piston during its movement in the second direction.

A compact construction is obtained if the piston is a hollow piston closed at one end, of which the cavity receives the differential pressure spring, its open end is connected to the operating circuit pump and is connected by bores to at least one valve chamber of the piston.

If the piston has at both sides projections of smaller diameter co-operating with abutment faces that are fixed with respect to the housing, the regions beyond these projections can be utilised as valve chambers.

It is also favourable if the bore is formed in a sleeve comprising a valve orifice consisting of several apertures and a control orifice consisting of several apertures, as well as an annular groove connecting the two and connected to the control circuit, and if the sleeve is received in a housing chamber of which the ends form abutments for the piston and comprise a connecting channel for each of the pumps.

With the aid of the control means according to the invention it is possible to increase the maximum speeds of vehicles equipped with such steering means because, upon break-down of one of the two pumps, the control circuit and operating circuit remain at least partially operative, so that steering need on the one hand not be performed exclusively by manual forces and on the other hand can be adjusted comparatively rapidly. A prerequisite for this is that in the case of emergency control at least one of the pumps remains operative.

This can be ensured with considerable safety if the control circuit pump is driven by an electric motor fed by an accumulator. Running of the control circuit pump proves that the accumulator is in order. It will therefore also continue to move in the case of an emergency. Since the control circuit pump is the smaller of the two pumps, a correspondingly smaller accumulator will be adequate.

Another possibility is that the control circuit pump is driven by the wheels of the vehicle to be steered, e.g. through gearing. As long as the vehicle is moving the control circuit pump therefore remains in operation. The faster the speed of the vehicle, the more pressure fluid will be fed. If the vehicle comes to rest, the emergency control will generally no longer be required.

Control means of the kind here in question normally have in the control circuit a quantity setting device comprising a measuring motor which adjusts a follow-on element in such a way that the rotary angle of the manual steering wheel corresponds to a proportional quantity of pressure fluid in the control circuit and thus also a proportional quantity of pressure fluid in the operating circuit. If, on the other hand, one uses a continuously adjustable setting valve as the quantity setting device, no proportionality whatsoever will exist. However, with control means having the discharge valve according to the invention, an approximately constant pressure drop is maintained across the quantity setting device. The result of this is that each position of the setting valve corresponds to a substantially accurately defined quantity of pressure fluid in the control circuit, so that such continuously adjustable setting valve can be used instead of or in addition to the first-mentioned quantity setting devices.

A suitable setting valve may be a ¾-way valve which, in the neutral position, blocks the return flow to the tank. One can also employ several setting valves in parallel or one can connect in parallel at least one setting valve and at least one control device that blocks the return flow to the tank in the neutral position and has a quantity measuring device and follow-on device.

Such a setting valve permits, for example, a rapid adjustment to be obtained for the wheels to be steered in the case of very slow vehicle movements when a fine control is not important. In addition to the normal steering position one can also provide further position at which steering can be effected with the aid of the setting valves. Such arrangements are, for example, utilised in the case of forestry machines for transporting logs etc.

Examples of the invention will now be described in more detail with reference to the drawing, in which.

FIG. 3 diagrammatically shows the discharge valve in various operating positions a–d;

FIG. 4 illustrates the operating characteristic in the various operating positions for the control equipment serving as the quantity setting device;

FIG. 5 shows the operating characteristic in the various operating positions for the setting valve; and FIG. 6 illustrates another embodiment of the discharge valve.

Figure 1:
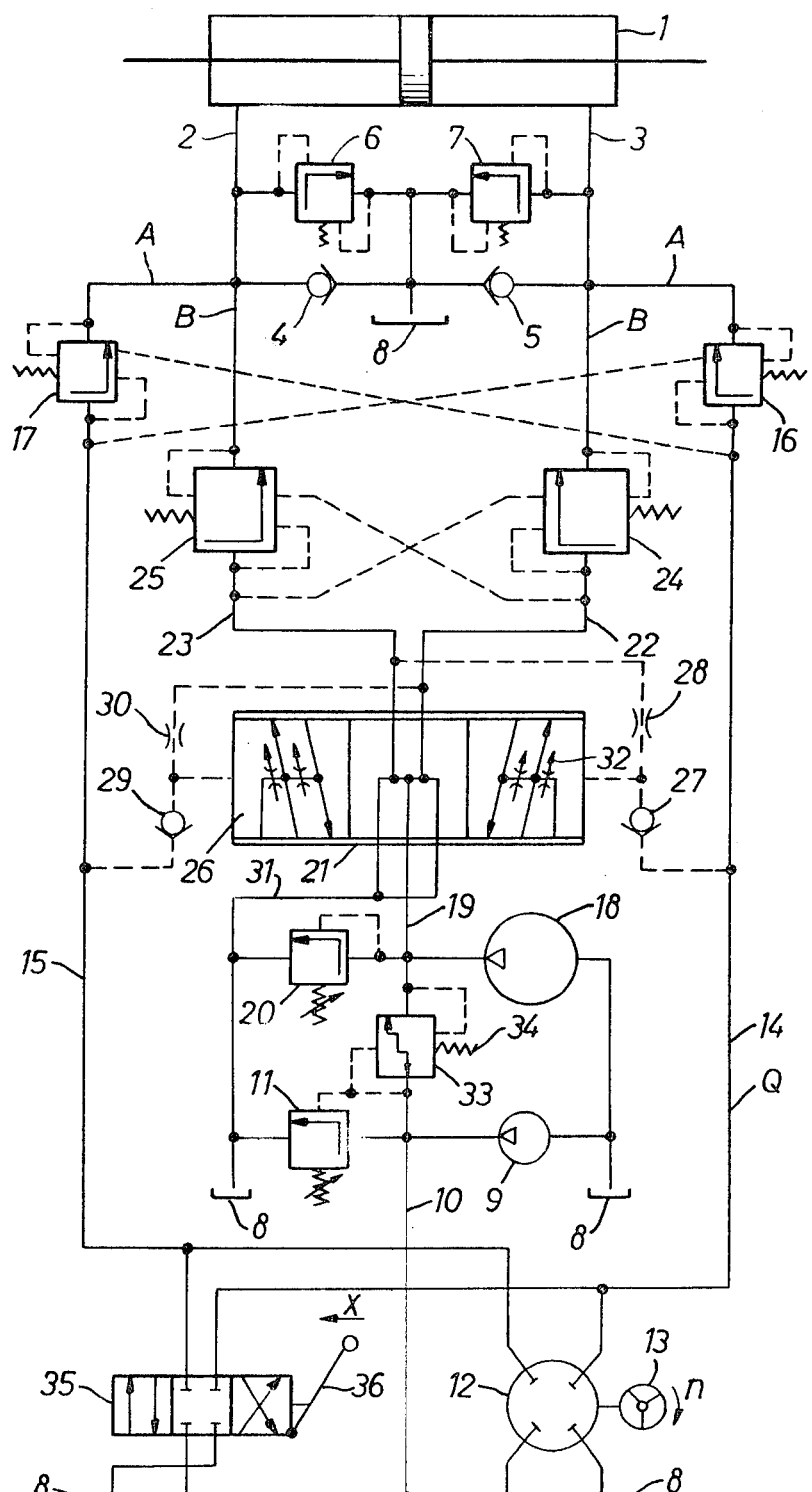
FIG. 1 is a circuit diagram of the control means according to the invention.

The hydraulic control means according to FIG. 1 are illustrated as a circuit diagram.

A servo motor 1 which, for example, adjusts the wheels to be steered, comprises two connecting conduits 2 and 3 which are connected in conventional manner to the tank 8 by way of replenishment valves 4, 5 and over-pressure safety valves 6, 7. Both connecting conduits 2 and 3 are connected to a control circuit A as well as to an operating circuit B.

The control circuit A comprises a control circuit pump 9 of which the pressure conduit 10 is connected to the tank 8 by way of an over-pressure valve 11. A control device 12 fed by way of the pressure conduit 10 may be constructed in accordance with known prior art and comprises a valve element actuatable by a manually operated steering wheel 13, a measuring motor and a follow-on valve element actuated by the measuring motor. Depending on the direction of rotation of the manually operated steering wheel 13, a metered quantity of pressure fluid reaches a right-hand control circuit conduit 14 or a left-hand control circuit conduit 15. The control circuit conduits are connected to the associated motor connection conduits 2 or 3 by way of a respective throttle valve 16 or 17 controlled by the pressure difference cross-section applied thereto. Each throttle valve is in the one direction under the pressure of the connecting conduit 2, 3 and a spring. In the other direction, either the pressure of its own control circuit conduit or the pressure of the other control circuit conduit is effective, depending on which of the pressures is larger. Consequently the one throttle valve is so opened in dependence on the quantity of fluid flowing therethrough that a certain pressure drop occurs thereacross whereas the other throttle valve which must receive the returning pressure fluid is controlled into the fully open position.

The operating circuit B comprises an operating pump 18 of which the pressure conduit 19 is connected to the tank by way of an overpressure valve 20. The pressure conduit is extended beyond a force comparator 21 in a right-hand operating circuit conduit 22 or a left-hand operating circuit conduit 23. These operating circuit conduits are, by way of throttle valves 24 or 25 controlled in cross-section by the pressure differences applied thereto, connected to the connecting conduits 2 and 3. The throttle valves 24 and 25 operate in the same manner as the throttle valves 16 and 17. The force comparator 21 has a piston 26 of which the end faces are subjected in the one direction by way of a check valve 27 to the pressure in the right-hand control circuit conduit 14 or by way of a throttle 28 to the pressure in the left-hand operating circuit conduit 23 and, in the other direction, by way of a check valve 29 to the pressure in the left-hand control circuit conduit 15 or by way of a throttle 30 to the pressure in the right-hand control circuit conduit 22, depending on which pressure is the higher. In the illustrated rest position, the pressure conduit 19 and the two operating circuit conduits 22 and 23 are connected to the tank 8. When the piston 26 is moved to the right, the pressure conduit 19 communicates with the right-hand operating circuit conduit 22 and the left-hand operating circuit conduit 23 communicates with the tank return conduit 31; simultaneously, depending on the condition of opening, part of the supplied pressure fluid is fed by way of a throttle 32 direct to the tank return conduit 31. Displacement to the left takes place under the influence of the pressure in the right-hand control circuit conduit 14. The displacement continues, until the same pressure obtains in the right-hand operating circuit conduit 22. Consequently, a quantity of pressure fluid flows to the servo motor 1 through the operating circuit B that is proportional to the metered quantity of pressure fluid in the control circuit A.

Between the pressure conduits 10 and 19 of the two pumps 9 and 18 there is a discharge valve 33 which is governed in the one direction by the pressure in the conduit 10 and in the other direction by the pressure in the conduit 19 and a differential pressure spring 34. During normal operation, the discharge valve ensures that the pressure in the conduit 10 is higher than the pressure in the conduit 19 by a substantially constant amount, e.g. 5 bar. Since the pressure drop in the force comparator 21 is relatively low, and the pressure in one control circuit conduit 14, 15 is equal to that in the corresponding operating circuit conduit 22, 23, a substantially constant pressure difference exists between the pressure conduit 10 and the control circuit conduits 14 or 15. Parallel to the control device 12 there is a second quantity setting device in the form of a setting valve 35 which is continuously adjustable by means of a hand lever 36. Because of the substantially constant pressure difference to both sides of this setting valve, the amount of pressure fluid flowing there through is roughly proportional to the cross-section of the opening or the displacement path of the valve 35. The so dimensioned control quantity is then also proportional to the operating quantity flowing in the operating circuit. The setting valve 35 as well as the control device 12 blocks the pressure conduit 10 from the tank return conduit in the neutral position, so that defined conditions obtain.

Figure 2:
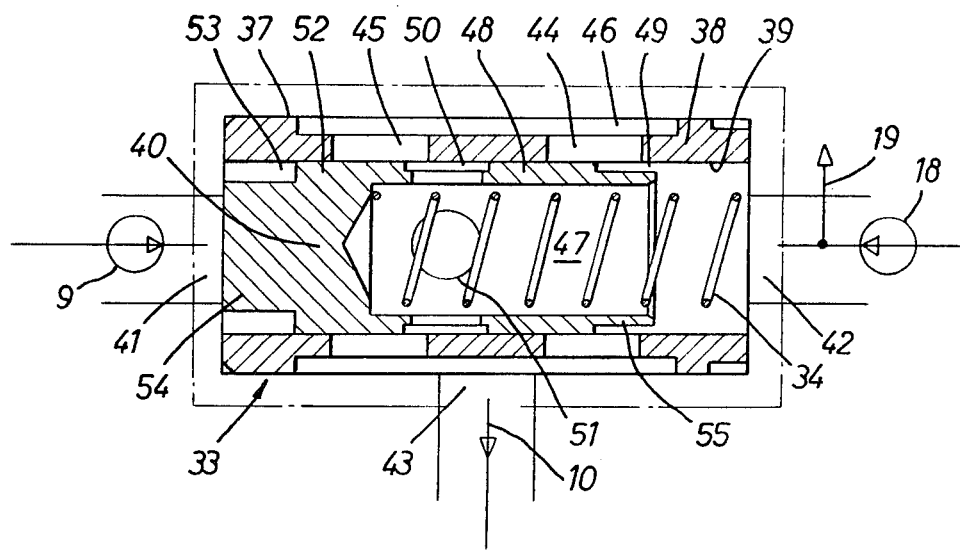
FIG. 2 is a longitudinal section through a discharge valve according to the invention.

FIG. 2 illustrates an embodiment of the discharge valve 33. Disposed in a housing chamber 37 there is a sleeve 38 having a bore 39 in which a piston 40 is displaceable. The housing chamber has at the left end a first connection 41 for the control circuit pump 9 and at the right end a second connection 42 for the operating circuit pump 18 and at the periphery a third connection 43 for the control circuit pressure conduit 10. The sleeve 38 comprises a valve orifice 44 in the form of a group of holes and, at an axial spacing, a control orifice 45 likewise in the form of a set of holes. The valve and control orifices are interconnected at the periphery and connected to the connection 43 by an annular groove 46. The piston 40 has a cavity 47 in which there is engaged the pressure differential spring 34 which is supported at the end wall of the housing chamber 37. A first collar 48 separates two annular valve chambers 49 and 50 from one another. The valve chamber 50 communicates with the interior 47 by way of holes 51. The collar 48 is so dimensioned that it tends to cover the valve orifices 44. A second collar 52 separates the valve chamber 50 from a further annular valve chamber 53. At both ends, the piston possesses projections 54 or 55 of smaller diameter which can abut against the end faces of the housing chamber 37.

The function of the discharge valve will now be explained with reference to FIGS. 3, 4 and 5. In FIG. 3 the discharge valve is illustrated in various positions. FIG. 4 illustrates the associated characteristic curve of the control device 12, the control quantity Q in the one control conduit being shown throughout a turning time $n$ of the manual steering wheel 13. FIG. 5 shows the characteristic curve of the setting valve 35, the control quantity Q being shown for the displacement $x$ out of the neutral position.

a. During normal operation, the piston 40 assumes a position of equilibrium at which the force created by the control pump pressure is equal to the force produced by the operating pump pressure plus the force of the spring 34. This results in the course of the flow shown in broken lines in FIG. 3a), in which a portion of the pressure fluid conveyed by the control circuit pump 9 is transmitted to the operating circuit B. In the position of the piston 40, the transferred quantity results in a pressure drop determined by the pressure differential spring 34. Typical values are, for example 2 bar between the connections 41 and 43, as well as 5 bar between the connections 43 and 42. These conditions remain substantially unchanged even if the operating pressures of the pumps 9 and 18 vary considerably.

The control device 12 operates in conventional manner. The more rapidly the manually operated steering wheel 13 is turned, the larger will be the control quantity Q and thus the proportional quantity of pressure fluid in the operating circuit B.

Upon actuation of the setting valve 35, the control quantity Q is substantially proportional to the displacement path $x$. The reason for this is that the throughflow opening in the setting valve 35 increases in proportion to the displacement path $x$ and the pressure between the conduits 10 and 14 is approximately equal to the constant pressure drop between the connections 43 and 42.

b. If the operating circuit pump 18 delivers no pressure fluid or inadequate pressure fluid, the pressure in the pressure conduit 19 drops with a view to keeping the pressure drop constant, the piston 40 wanders to the right up to the abutment. A larger quantity of the amount conveyed by the control circuit pump 9 now reaches the operating circuit B, a substantially constant pressure drop again occurring at the discharge valve.

The control device 12 operates in conventional manner. With a rotary speed $n_1$, however, the entire amount of pressure fluid that is still available for the control circuit A is used up. A higher rotary speed is therefore impossible. However, since intensification occurs in the operating circuit through a proportional quantity, not only is normal control achieved up to the rotary speed $n_1$ but there is also a rapid adjustment of the servo motor 1 that is sufficent for emergencies. Upon actuation of the setting valve 35 there is likewise the usual proportional control up to a displacement path $x_1$, because dividing up of the quantity of pressure fluid conveyed by the control circuit pump 9 takes place in a manner such that the desired pressure drop is substantially maintained in the discharge valve 33.

It should be mentioned that the values $n_1$ and $x_1$ depend on the pumping capacity still possessed by the operating circuit pump 18. The minimum values that have been entered obtain if only the control circuit pump 9 is still in operation and its conveyed quantity is divided up amongst both circuits A and B.

c. If the control circuit pump 9 is of too small a design or does not convey enough for some reason, the piston 40 wanders towards the left. The valve orifice 44 is then first closed by the collar 48 and a new path is then opened between the connections 42 and 43 in that the valve orifice 44 is over-controlled by the valve chamber 49. Simultaneously, the control orifice 45 becomes more fully covered by the collar 52. In this condition, part of the quantity of pressure fluid conveyed by the operating circuit pump 18 flows into the control circuit A by way of the discharge valve 33.

The control device 12 operates entirely normally as long as the quantity of the control pump is sufficient, i.e. up to the rotary speed $n_2$. At a higher rotary speed, an additional torque must be applied through the manually operated steering wheel, by means of which the measuring motor acts as an auxiliary pump. By reason of the pressure conditions resulting therefrom, the piston 40 assumes the FIG. 3c position. The missing control quantity is therefore replenished from the operating circuit. The additional torque to be applied at the manually operated steering wheel 13 is comparatively small because the control quantity is supplied under pressure.

Upon actuation of the setting valve 35, there are likewise no changes from normal operation up to the displacement path $x_2$. With a larger displacement path, the pressure difference between the conduits 10 and 14 or 15 drops considerably because the pressure drop at the discharge valve 33 is reversed, although efforts are made to keep the oppositely directed pressure drop as small as possible by selecting correspondingly large flow cross-sections. The pressure difference between the conduits 10 and 14 or 15 is therefore for the most part occasioned by the pressure drop in the force comparator 21. Consequently, there is a kink in the characteristic curve at $x_2$. Upon further adjustment, the control quantity Q increases more slowly.

d. If the control circuit pump 9 becomes completely inoperative, the piston 40 moves to the left-hand limiting position to start with. The operating circuit pump 18 then supplies both circuits A and B.

At the control device 12, therefore, a torque must be exerted on the manually operated steering wheel 13 to begin with, that operates the measuring motor as a pump. In other respects, however, the rotary speed $n$ leads to the normal control quantity Q.

For the setting valve 35, the aforementioned small pressure difference between the conduits 10 and 14 or 15 obtains to begin with. Consequently, a comparatively small control quantity Q is in this case obtained over the entire displacement path but it increases substantially in proportion to the adjustment.

It will be evident from the above that, if the operating circuit pump 18 is inoperative, the same conditions obtained as during normal operation up to a particular rotary speed $n_1$ or up to a certain displacement path $x_1$. This is of great importance for reliable emergency control. If other provisions are made to ensure that the control circuit pump 9 remains in operation during travel, o.g. by a drive from an electric motor fed from an accumulator or by a drive derived from the vehicle wheels, all eventualities are taken care of. However, even if the control circuit pump breaks down, a considerably better emergency control operation is possible than in known cases.

FIG. 6 illustrates a different embodiment of a discharge valve. A piston 56 is displaceable in a bore 57. The bore has two valve orifices 58 and 59 in communication with the pressure conduit 19. The piston 56 has a valve chamber 60 between two collars 61 and 62. The valve chamber 60 communicates with the pressure conduit 10 by way of a bore 63. An end chamber 64 is supplied with the pressure of the pressure conduit 10. An end chamber 65 contains the pressure differential spring 34 and is supplied with the pressure of the pressure conduit 19. Upon displacement of the piston 56 to the right, the above-described operating conditions a and b obtain, and upon displacement to the left the operating conditions c and d obtain.

The discharge valve could also be of different construction. For example, the connections of the conduits 10 and 19 in FIG. 6 may be interchanged. One may also use a piston with two valve chambers which co-operate with a single valve orifice in the bore and connected to the pressure conduit 19.

We claim:

1. A hydraulic control unit for a servomotor comprising a control circuit having a pump and a hand operated metering motor, and operating circuit having a pump, said control and operating circuits intersecting upstream of said servomotor, a pressure comparison throttling and proportioning valve having first and second ports, connected respectively to said control and operating pumps and a third port connected to said metering motor, said proportioning valve being controlled by a differential pressure applied to said first and second ports and having a normal operating mode in which there is a major fractional flow of fluid from said first port to said third port and a minor fractional flow of fluid from said first port to said second port.

2. A hydraulic control unit according to claim 1 in which said valve includes a movable valve element, and spring means biasing said valve element in a closing direction relative to said first port.

3. A hydraulic control unit according to claim 2 in which there is a control pump failure mode wherein said valve element closes said first port and provides for operating pump fluid to enter through said second port and exit through said third port.

4. a hydraulic control unit according to claim 2 in which there is an operating pump failure mode wherein said valve element in a fixed extreme position provides a free flow of fluid from said first port to said third port, said fixed position providing an opening which permits a throttled flow of fluid from said first port to said second port.

5. A hydraulic control unit according to claim 2 wherein there is a control pump partial failure mode in which said valve element assumes an intermediate position to provide for a flow of fluid from each of the first and second ports to said third port.

6. A hydraulic control unit according to claim 1 wherein said proportioning valve includes a casing having a bore with a cylindrically shaped valve element slidably disposed in said bore, said first and second ports being at opposite ends of said bore, said third port being formed with first and second transverse openings in said bore, a cylindrically shaped recess in said valve element opening towards said second port, spring means in said recess biasing said valve element towards said first port, a transverse opening in said valve element to provide fluid communication between said recess and said third port, collar means on said valve element to provide circuit switching between said first and second ports and said third port, said valve element having a fixed control pump inoperative position wherein said first port is closed and the flow is from said second port to said third port, said valve element having a fixed operating pump inoperative position wherein the flow is from said first port to said second port and to said third port, said valve element having a normal intermediate position wherein the flow is from said first port to said second port and said third port, said valve element having a intermediate position corresponding to a partial breakdown of said control pump wherein the flow is from said first and second ports to said third port.

7. A hydraulic control unit for a servomotor comprising a control circuit having a pump and a hand operated metering motor, an operating circuit having a pump, said control and operating circuits intersecting upstream of said servomotor, a pressure responsive throttling and proportioning valve having a casing with a bore, a valve element having first and second spools at opposite ends slidably disposed in said bore, spring means biasing said valve element in one direction, said valve element having differential forces on said valve element which are control pump pressure at one end and operating pump pressure at the other end supplemented by the action of said spring means, a first transverse port in said casing connecting said control pump to said bore, second and third spaced apart transverse ports in said casing straddling said first port and connecting said operating pump to said bore, said valve having a normal operating mode in which there is a major fractional flow of fluid from said control pump to said control circuit and a minor fractional flow of fluid from said first port to said third port.

8. A hydraulic control unit according to claim 7 wherein said spools are arranged to provide circuit switching between said ports, said valve element having a control pump inoperative position wherein said spring means moves said valve element so that the flow is from said second port to said first port, said valve element having an operating pump inoperative position wherein the control pressure moves said valve element so that the flow is from said first port to said second port, and to said third port, said valve element having a intermediate position corresponding to a partial breakdown of said control pump wherein the flow is from said second port to said first port.

* * * * *